United States Patent [19]

Wilson et al.

[11] Patent Number: 4,632,574
[45] Date of Patent: Dec. 30, 1986

[54] APPARATUS FOR FLUIDIC SUPPORT

[75] Inventors: James L. Wilson, San Antonio, Fla.; Robert C. Folweiler, Bedford, Mass.

[73] Assignee: GTE Laboratories Incorporated, Waltham, Mass.

[21] Appl. No.: 688,226

[22] Filed: Jan. 2, 1985

[51] Int. Cl.[4] ............... F16C 32/02; F16C 32/06; C03B 40/04
[52] U.S. Cl. .................. 384/12; 65/182.2; 384/116; 384/100
[58] Field of Search .......... 384/100, 114–120; 308/5 R; 65/25.1, 182.1, 182.2

[56] References Cited

U.S. PATENT DOCUMENTS

| | | | |
|---|---|---|---|
| 2,760,832 | 8/1956 | Bidwell | 384/116 |
| 3,231,046 | 1/1966 | Ohrnberger | 384/100 X |
| 3,600,046 | 8/1971 | Redmon | 308/5 R |
| 3,639,074 | 2/1972 | Killick | 384/100 X |
| 3,746,328 | 7/1973 | Martt | 384/100 X |
| 3,782,791 | 1/1974 | Neumann et al. | 384/116 |
| 4,035,038 | 7/1977 | Hinchcliffe et al. | 384/117 |
| 4,113,324 | 9/1978 | Rohr | 384/116 |
| 4,184,721 | 1/1980 | Gemein et al. | 384/116 |
| 4,212,504 | 7/1980 | Krylor et al. | 384/120 |
| 4,263,032 | 4/1981 | Sinclair et al. | 65/3 A |
| 4,302,230 | 11/1981 | MacChesney | 65/3.12 |

FOREIGN PATENT DOCUMENTS

| | | | |
|---|---|---|---|
| 1458619 | 11/1966 | France | 384/114 |
| 142376 | 6/1980 | German Democratic Rep. | 384/117 |
| 2108102 | 5/1983 | United Kingdom . | |
| 250617 | 8/1969 | U.S.S.R. | 384/117 |
| 329915 | 2/1972 | U.S.S.R. | 384/116 |

Primary Examiner—Stuart S. Levy
Assistant Examiner—Thomas R. Hannon
Attorney, Agent, or Firm—Fred Fisher

[57] ABSTRACT

A fluidic support device is described that counteracts the gravitational bending moment present in a substrate tube during a modified chemical vapor deposition preform fabrication process. Hence, use of this device results in the production of a straight optical fiber preform. The device includes a hemicylindrical annulus section in close proximity to the portion of the substrate tube to be supported, and uses flowing fluid to offset gravity and to center the substrate tube. Gaseous use of the device increases and stabilizes the thermophoretic force without contact by either solid or liquid materials, avoiding any reduction in strength of the finished fiber.

11 Claims, 11 Drawing Figures

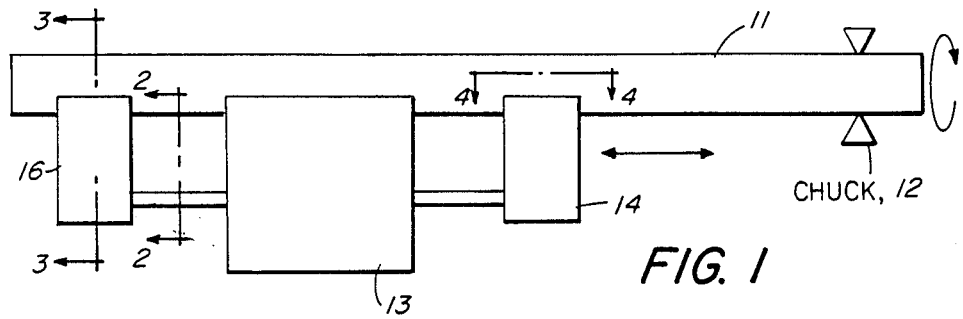
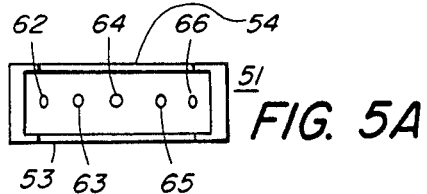
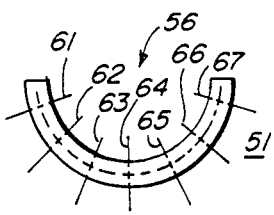
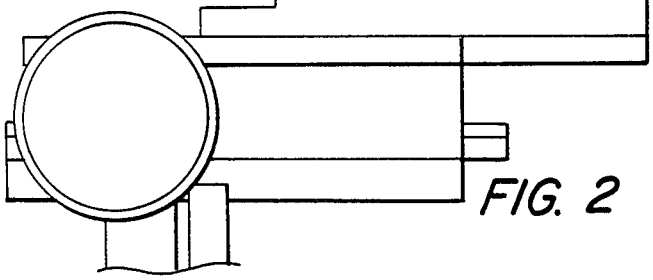
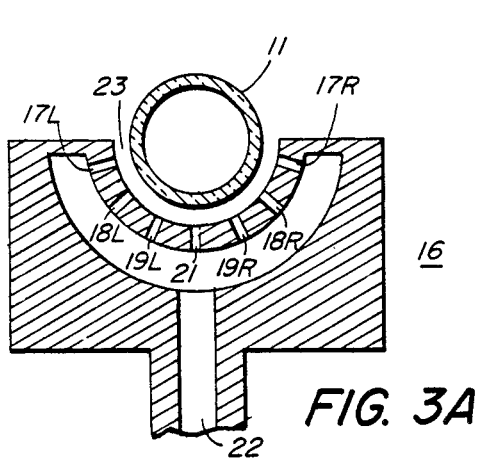
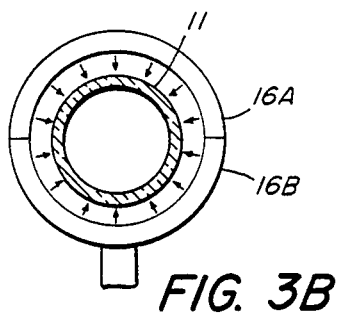

4,632,574

APPARATUS FOR FLUIDIC SUPPORT

BACKGROUND OF THE INVENTION

1. Field of the Invention

This invention relates to new and improved methods of and apparatus for fluidic support. In particular, this invention relates to new and improved methods of and apparatus for (1) counteracting the gravitational bending moment present in a substrate tube during a modified chemical vapor deposition preform fabrication process, and (2) improved cooling of the substrate tube to increase the thermophoretic force gradient. Hence, use of the methods and apparatus of this invention results in a straight optical fiber preform, with greater deposition efficiency.

2. Description of the Prior Art

The modified chemical vapor deposition (MCVD) process used to produce optical fibers utilizes a quartz substrate tube that is mounted in a glass working lathe. The substrate tube is chucked at one end and is supported by graphite vee blocks or nylon or Teflon rollers at the opposite end. The substrate tube is then heated at the chucked end and straightened to the center line of the lathe. A larger tube is inserted in another chuck and sealed to the substrate tube. The supports are now removed.

A torch assembly is mounted on a fire carriage that traverses the length of the lathe bed that heats the exterior of the substrate tube. Each traversal commences at the portion of the tube closest to the chemical input end, and is termed a pass. The heat that is produced by the torch assembly is required to cause the chemicals on the interior of the tube to react, and also to fuse or sinter the glass particles that are deposited on the inner wall of the tube. Temperatures up to 2100° C. are attained during the course of the process, well above the softening point (1813° C.) of fused quartz. The MCVD process typically requires over 60 torch passes and eight to twelve hours to complete. The tube is rotated during the process to maintain circular symmetry, but this rotation does not provide any force to center the tube. On the contrary, in fact, rotation causes any existing eccentricity to increase because of centrifugal force.

Disadvantageously, the sagging of a rotating quartz tube occurs at the extreme ends thereof, especially the end at which the heating is initiated. Such sagging is the result of the gravitational bending moment and small deviations normally present in the tube.

The heat zone produced by the torch assembly is located between the two supporting chucks for the quartz tube. When the substrate tube is heated above the softening point at either end, the effect of the nearest supporting chuck is negated, while the bending moment is the greatest. Since so many passes are performed, the problem increases with each pass, and results in a wavy or eccentric preform. The eccentricity also causes asymmetric heating, compounding the problems of temperature control and noncircularity of the deposited material. The waviness of the preform reduces the yield of the preform in either the deposition process or the draw process. Noncircular deposition leads to cores that are not concentric with the outside of the cladding, and may have unacceptable, out-of-tolerance dimensions.

U.S. Pat. No. 4,263,032, issued Apr. 21, 1981 to Sinclair et al., and U.S. Pat. No. 4,302,230, issued Nov. 24, 1981 to MacChesney et al., relate to making optical fiber preforms more expeditiously by enhancing the thermophoretic deposition force. The '032 patent suggests a fluid stream as a cooling means. The '230 patent suggests water for cooling. Disadvantageously, the '230 patent prefers de-ionized water in order to avoid introduction of contaminants which may contribute to a lowering of the strength of the resultant fiber.

Direct physical support of a glass surface by a material in contact with it causes problems by introducing defects and contamination into the surface of the preform. Unfortunately, there appears to be no material known that can resist the temperatures involved and not damage the surface of the preform by scratching or contamination. As is well recognized, brittle materials such as silica glass are strongly dependant on the integrity of the surface for strength, with an essentially perfect surface required to retain the intrinsic high strength. It is well known that physical contact of a glass surface by a solid object will leave defects in the surface that are difficult to heal, and sometimes particles will be left behind, generating a low strength site for future failure. A defect can readily reduce the strength of glass fiber after drawing by two orders of magnitude. In addition, any particle present on the preform surface will have its size magnified, relative to the fiber, during the drawing process, thus creating a larger defect, and a probable low strength failure point.

Liquids can be considered for a coolant to aid in the thermophoretic force as indicated in the patent of MacChesney, but the addition of a cooling water stream to the apparatus is difficult. In addition, the water must be of very high quality, such as freshly deionized or distilled, to avoid leaving any residue that will act to harm the surface.

SUMMARY OF THE INVENTION

One object of this invention is to provide a new and improved fluid bearing for offsetting the bending moment induced by gravity in a heated, quartz substrate tube.

Still another object of this invention is to provide a new and improved method of and apparatus for fluidicly supporting a substrate on a cushion of flowing high-pressure fluid.

Yet another object of this invention is to provide for a new and improved method of and apparatus for supporting a heated quartz substrate tube to thereby produce extremely straight preforms which enhance the flame control for producing more uniform core layers therefor.

Still yet another object of this invention is to provide for a new and improved air-bearing which acts to cool a heated glass substrate, increasing the temperature gradient thereof to thereby enhance the rate and uniformity of the deposition process.

Through the practice of this invention, the preform can be supported without any solid or deleterious material in contact therewith. Thus, the strength of a produced fiber is not weakened due to the introduction of defects and the presence of foreign matter.

In accordance with one aspect of this invention, a fluid bearing includes a structure having a hemicylindrical concave upper surface with a radially extending recess formed therein so that radially extending end walls are formed at axial ends of the recess. The concave upper surface has a plurality of radially disposed and symmetrically arranged orifices oriented along the recess. Gas is applied to the orifices interior to the structure. In accordance with certain features of the invention, radially inward directed walls are provided axially along the recess. The structure can be formed of any suitable machinable material, and aluminum has been found acceptable.

In accordance with still yet another aspect of the invention, a method of inhibiting bending of a horizontally oriented cylindrical quartz substrate tube while it is rotated about its principal axis and while a torch assembly is traversed axially in proximity to the tube to heat the tube to produce an optical fiber preform, includes directing fluid radially toward the tube. The directing of the fluid is performed in the vicinity of the torch assembly, but isolated or insulated therefrom.

The invention enhances the thermophoretic effect for depositing particulate material on appropriate substrates during fiber fabrication processing.

Thermophoresis is an effect which introduces force that directs small, gas borne particles from a relatively hotter region to a relatively cooler regions; in this case the latter is the substrate upon which they deposit. Enhancement of this effect, which results in movement of the particles from hotter to cooler regions, will yield increased deposition rates. In this invention, cooling with an appropriate fluid, such as air, is used to lower the temperature of the substrate upon which the deposition occurs, thereby increasing the thermal gradient to which the particles are exposed, and improving the deposition efficiency, rate and uniformity.

BRIEF DESCRIPTION OF THE DRAWINGS

Other objects, advantages, and features of this invention, together with its construction and mode of operation, will become more apparent from the following description, when read in conjunction with the accompanying drawings, in which:

FIG. 1 is a diagrammatic view showing a rotating quartz tube and a traversing burner, together with two sets of fluid bearings, one forward and one aft of the burner in accordance with one embodiment of the invention;

FIG. 2 is a view taken along the line 2—2 of FIG. 1, showing a side view of a fluidic bearing in accordance with this invention;

FIG. 3a is a cross-sectional view of a fluidic bearing in accordance with one embodiment of this invention, taken along the line 3—3 of FIG. 1;

FIG. 3b is a view of another embodiment of a fluidic bearing, taken along the line 3—3 of FIG. 1;

FIGS. 5a and 5b are top and side views, respectively, of a fluidic insert adapted to be inserted into the assembly depicted in FIG. 4.

DETAILED DESCRIPTION

Figure 4:
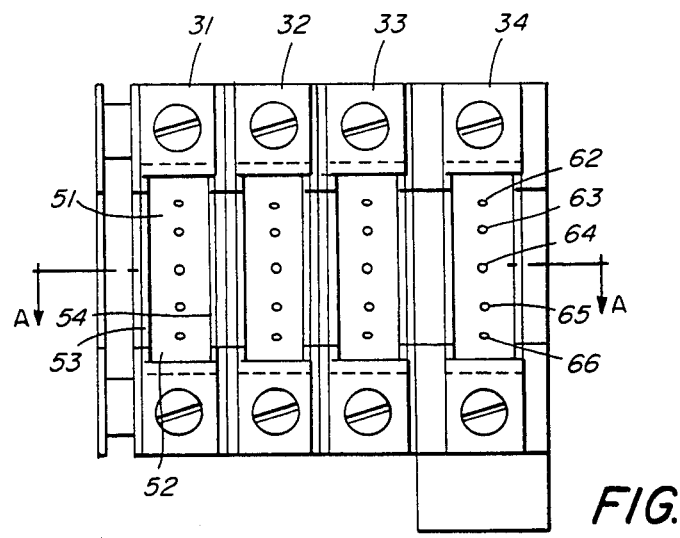
FIG. 4 is a view of a fluidic bearing in accordance with this invention, viewed along the direction 4—4 of FIG. 1.

Prior to this invention, it was noted that as a quartz tube is rotated and heated during a modified chemical vapor deposition process, it tended to sag, especially at the end when the chemicals enter. It was further noted that rotation of the tube appeared to have but a mere marginal effect on the sagging. The sag appeared to be caused by a temperature instability, natural bending moment, normal variations in the straightness of the tube, and the set-up procedure.

After a quartz tube had been properly straightened and mounted and temperature overshoot was under control, the only remaining concern was an actual bending moment of the tube. Rotation of the tube did not completely overcome it.

It was noted that a one meter length quartz tube, supported at one end, had a tendency to sag one to two millimeters due to gravity. Even when the quartz tube was supported at both ends, it was noted that heating the tube to a temperature approaching the softening point of the quartz allows the tube plastically or viscously to deform where it is heated, permitting it to sag. This sagging occurred at the input side of the tube, effectively negating the second support to the tube.

Referring to the drawings, there is shown a support device for the quartz tube. Broadly, the support is termed a fluidic support, and specifically could be referred to as a pneumodynamic preform support device.

Referring to FIG. 1, there is illustrated a block diagram of the invention wherein there is depicted a quartz substrate tube 11, which is rotated about its central axis by a chuck 12. The length of the substrate tube 11 can be a meter, for example, 1.1 meters, or other convenient length. The tube 11 is heated along its length by a traversing torch assembly or burner 13. As is indicated above, as the prior art, such traversing burner heats the tube 11 so that the glass particles that are deposited on its inner wall fuse or sinter. On both sides of the burner 13 are fluidic bearings 14, 16. The bearing 14 is located in front of the burner 13; the bearing 16 is located aft of the burner 13. The gaseous bearings 14 and 16 can be identical, or they can be similar. In certain cases, it may be desirable solely to have the forward bearing 14 by itself with the burner 13, and to not utilize an aft bearing 16.

As viewed in the cross-sectional view of FIG. 3a, a fluidic support 16 includes at least one metal block, each with a hemicylindrical groove (not shown in FIG. 3a) and internal gas passages 17L, 18L, 19L, 17R, 18R, 19R and 21 that form the bearing 16. A set of four bearings 16, for example, is mounted on each side of the burner 13, so that each corresponding side of the tube 11 is supported. As indicated above, it is possible that only one side of the tube 11 need be supported without the other, in accordance with the teachings of this invention. The spacing between the blocks or sets of bearings 14 or 16 is not critical, and a convenient distance of 150 millimeters has been chosen for one embodiment and has been found to be effective. Those sets of bearings 14, 16 are on adjustable mounts attached to the fire carriage or burner 13, permitting the spacing between the hemicylindrical surface of the bearings 14, 16 and the substrate tube 11 to be adjusted to desired design considerations.

A bearing 14 or 16, if desired, can be mounted on an air-powered cylinder (not shown) that can raise the bearing 14 or 16 from a lower inoperative position to an operative position in association with the substrate tube 11. For most of the horizontal traverse, the air cylinder can then subsequently lower the bearing 14 or 16 if such bearing is in a contentious position to permit the flame burner 13 to complete its traverse, such as when the dust catcher tube is approached. An appropriate positioning sensing mechanism can cause automatic retraction of such an air powered cylinder when the appropriate bearing 14 or 16 approaches the end of the traverse, and can cause raising of such bearing when it can usefully support the substrate tube 11. If desired, the remaining bearing 16 or 14 can remain unretracted during the course of a run.

High pressure fluid can enter a common passageway 22 in the bearing 16, such fluid exiting from the orifices 17L, 18L, 19L, 17R, 18R, 19R, 21 into a recessed area 23 on a hemicylindrical surface of the bearing 16. The combination of the orifices 17L, 18L, 19L, 17R, 18R, 19R, 21 and recessed area 23 is effective to both lift and center the substrate tube 11.

A preferred fluid for operation of the quartz substrate tube fluidic support device is nitrogen which has been boiled off from a liquid supply. However, it is believed that any source of clean fluid, such as air, is equally suitable.

The flow of fluid can be adjusted to provide the amount of lift that the substrate tube 11 requires at its worst case end. The design of this invention is such that the lifting force of the fluidic bearing decreases as the substrate tube 11 rises, thereby providing a stable behavior.

In lieu of the hemicylindrical design as depicted in FIG. 3a, a complete cylindrical design can be provided as indicated in FIG. 3b, wherein an upper half bearing 16a and a lower half bearing 16b are abutted together to permit opening for installation of the tube 11.

Figure 4A:
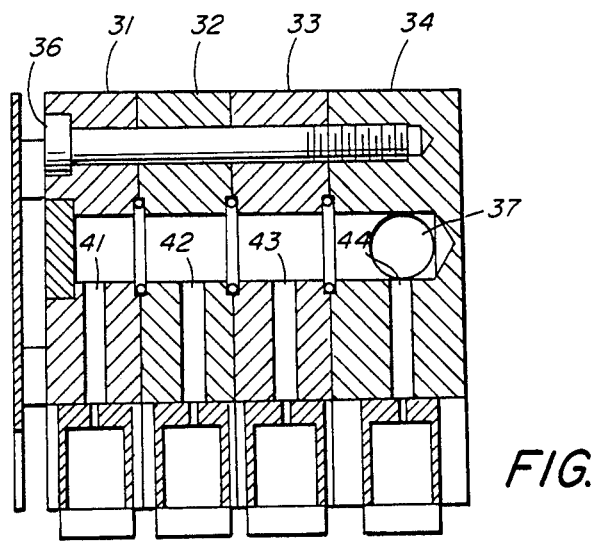
FIG. 4a is a section of the fluidic bearing depicted in FIG. 4 taken along the line A—A thereof.
Figure 6A:
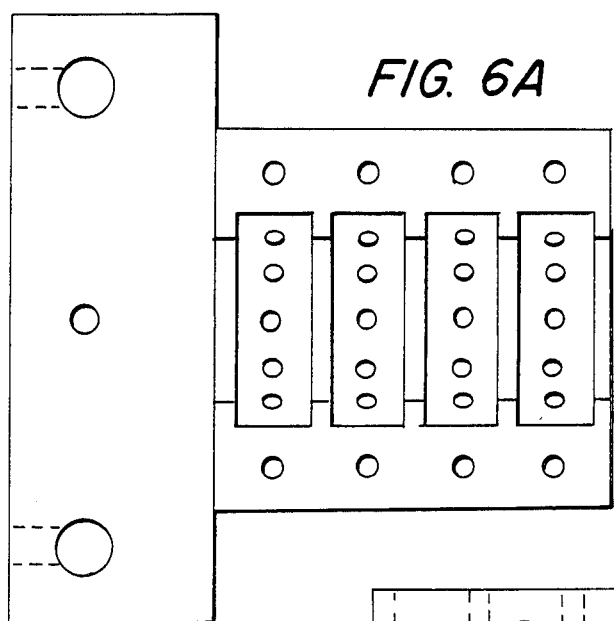
FIGS. 6a, 6b, and 6c are top, front, and side views, respectively, of the air support device depicted in FIG. 4.
Figure 6B:
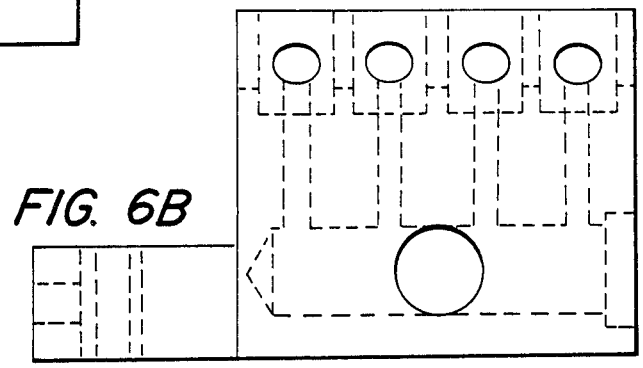
Figure 6C:
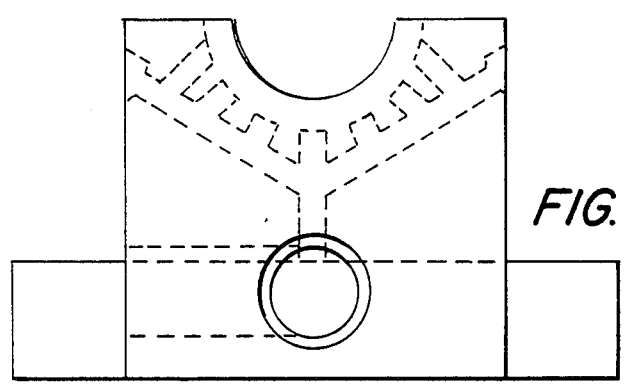

The air-bearing or fluid bearing can, for example, include a plurality of housings 31, 32, 33, 34 as depicted in FIG. 4. The housings 31, 32, 33, 34, as depicted in FIGS. 4 and 4a, are held together by suitable means, as by a bolt 36. The housings 31, 32, 33, 34 can contain a manifold 37 therein to provide air along orifices 41, 42, 43, 44 which are radially disposed from the manifold 37 and directed in an outwardly direction. Orifices 41 are radially disposed from the manifold 37 along equal paths and are directed along seven spokes towards orifices on a semiannulus 51 as depicted in FIG. 4. The semiannulus 51 includes a radially directed groove 52 therein, so as to provide for radially extending end walls 53, 54. The semiannulus 51 has a hemicylindrical concave upper surface 56 with a radially extending groove 52 formed therein. The concave upper surface 56 has a plurality of radially disposed orifices 61, 62, 63, 64, 65, 66, 67 oriented along the groove 52. The orifices 61-67 are oriented symmetrically about the center of the semiannulus 51.

In the embodiments preferred by the inventors hereof, the orifice 61 is the same size as the orifice 62, and the orifice 67 is the same size as the orifice 66. As expressed herein that various orifices diminish in size as they are further displaced from the largest orifice, it is meant to include the situation where not only are the various orifices actually diminishing in size as they are further displaced from the largest orifice, but to also include the situation where they may be the same size as an adjacent orifice, such as the preferred embodiment herein expressed wherein the orifices 61 and 62 are the same size and the orifices 66 and 67 are the same size. It is noted that both orifices 61, 62, and 66, 67 are diminished in size from that of the largest orifice 64 and, of course, they are further smaller than the orifices 63 and 65.

It is noted, however, that the relative sizes of the orifices 61-67 are not critical. Desirably, the orifices 61, 62, 63 should correspond in size to the orifices 67, 66, 65, respectively for symmetrical balance.

In accordance with one embodiment constructed by the inventors, the central orifice 64 had a diameter of 1.0 mm, the orifices 63 and 65 each had a diameter of 0.8 mm, and the remaining orifices 61, 62, 66, 67 each had a diameter of 0.5 mm. The bearing 16 was located approximately one millimeter from the bearing surface of the tube 11. It was noted that with both bearings 14, 16 having 60 pounds per square inch of pressure of nitrogen applied thereto, a 0.5 millimeter lift was observed in the quartz substrate tube 11.

In summary, there are two mechanisms for the support of the substrate tube. One is the kinetic energy of the air jet impinging upon the tube. The other is the bouyancy created by the larger cushion of air on the hollowed out recesses of the bearing. The relative importance of the two is not known, but is believed to be design dependent. The latter mechanism is believed to be more effective in the present design.

It is noted that this advantageous invention yields straight uniform preforms for use in making glass fibers, thereby resulting in a higher quality fiber with better geometry of the glass core and cladding. More preforms are completed by avoiding aborting a deposition run because of excessive eccentricity causing operating difficulty. The entry taper of deposited material within the quartz substrate tube is reduced and is established as a controlled length, thereby increasing preform yield and the geometry of the resulting fiber. The drawing of fiber is simplified, since a straight preform can be drawn to better fiber tolerances than a curved one, and the difficulty in centering such preform in the furnace is avoided.

The choice between dynamic support by the high velocity jets and the more static support by the larger cushion over the recess strongly affects the cooling that enhances the thermophoretic force of particulate deposition. Small orifices, with high velocity, dramatically improve the heat transfer by a process known as impingement cooling. It is well recognized in heat transfer that small, high velocity jets improve the exchange of heat by reducing the boundary layer adjacent to the surface to be cooled, thereby increasing the rate of heat transfer. By this increased cooling, the temperature of the tube wall is reduced, thereby increasing the temperature gradient inside the tube, and the thermopheretic force.

What is claimed is:

1. A fluid bearing comprising a structure having a hemicylindrical concave upper surface with solely one radially extending recess formed therein so that solely one radially extending end wall is formed at each axial end of said recess;
    said concave upper surface having a plurality of radially disposed orifices oriented along said recess, said orifices being symmetrically disposed therealong; and
    means for applying fluid to said orifices interior to said structure.

2. The fluid bearing as recited in claim 1 further comprising means for providing radially inward directed walls axially along said recess.

3. The fluid bearing as recited in claim 2 wherein said structure is formed of a machinable material.

4. The fluid bearing as recited in claim 1 wherein a central axis of each of said orifices lies in a common plane.

5. The fluid bearing as recited in claim 1 wherein one of said orifices is the largest of said plurality of orifices, and other remaining orifices diminish in size as they are further displaced from said largest orifice.

6. In combination, a plurality of fluid bearings as recited in claim 1 being aligned with said hemicylindrical concave upper surfaces along a common axis.

7. A fluid bearing comprising;
a hemicylindrical annulus of solid material having solely one radially extending recess formed therein whereby solely one radially extending end wall is formed at each axial end of said semiannulus;
said semiannulus having a plurality of radially disposed orifices oriented along said recess; and
means for applying fluid to said orifices along a convex portion of said semiannulus so that fluid passes through said orifices to a concave portion of said semiannulus.

8. The fluid bearing as recited in claim 7 wherein a central axis of each of said orifices lies in a common plane.

9. The fluid bearing as recited in claim 7 further comprising means for supporting said semiannulus so that said concave portion of said semiannulus is disposed in an upper direction.

10. The bearing as recited in claim 7 further comprising means for providing radially inward directed walls axially along said recess.

11. The fluid bearing as recited in claim 7 wherein said semiannulus has an orifice centrally located along said recess being the largest, and the remaining orifices diminishing in size as they are further displaced from said largest orifice.

* * * * *